(12) United States Patent
Okawara et al.

(10) Patent No.: US 7,204,965 B2
(45) Date of Patent: Apr. 17, 2007

(54) FILTER CATALYST FOR PURIFYING EXHAUST GASES

(75) Inventors: Seiji Okawara, Toyota (JP); Mamoru Nishimura, Nagoya (JP); Mikio Ishihara, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 679 days.

(21) Appl. No.: 10/454,672

(22) Filed: Jun. 5, 2003

(65) Prior Publication Data

US 2004/0018123 A1    Jan. 29, 2004

(30) Foreign Application Priority Data

Jun. 13, 2002    (JP)    ............................. 2002-173133

(51) Int. Cl.
  B01D 53/34    (2006.01)
  B01D 53/56    (2006.01)
  B01D 24/00    (2006.01)
  B01J 21/04    (2006.01)

(52) U.S. Cl. ...................... 422/177; 422/168; 422/178; 422/180; 502/439; 55/524; 55/523; 423/239.1

(58) Field of Classification Search ................ 422/178, 422/174, 180
  See application file for complete search history.

(56) References Cited

U.S. PATENT DOCUMENTS

| 3,785,781 | A |   | 1/1974 | Hervert et al. |
| 4,519,820 | A | * | 5/1985 | Oyobe et al. ................. 55/284 |
| 6,093,378 | A | * | 7/2000 | Deeba et al. ............ 423/213.5 |
| 6,764,527 | B2 | * | 7/2004 | Ishihara et al. ................ 55/485 |

FOREIGN PATENT DOCUMENTS

| DE | 3439891 A1 | 4/1986 |
| EP | 0 225 402 A1 | 6/1987 |
| EP | 1 132 587 A2 | 9/2001 |
| JP | A 4-301114 | 10/1992 |
| JP | A 6-159037 | 6/1994 |

(Continued)

OTHER PUBLICATIONS

English Translation of Notification of Reasons for Refusal (Jun. 13, 2006).

Primary Examiner—Glenn Caldarola
Assistant Examiner—Kaity Handal
(74) Attorney, Agent, or Firm—Oliff & Berridge, PLC

(57) ABSTRACT

A filter catalyst is for purifying exhaust gases emitted from internal combustion engines and including particulates, and includes a wall-flow honeycomb structure and an upstream-side straight honeycomb structure. The wall-flow honeycomb structure includes inlet cells clogged on the downstream side of the exhaust gases, outlet cells neighboring the inlet cells and clogged on the upstream side of the exhaust gases, filter cellular walls demarcating the inlet cells and the outlet cells and having pores, and a catalytic layer formed on the surface of the filter cellular walls and/or the surface of the pores of the filter cellular walls. The upstream-side straight honeycomb structure is disposed on the upstream side of the exhaust gases with respect to the wall-flow honeycomb structure, is provided integrally with the wall-flow honeycomb structure, and includes upstream-side straight cells in which the exhaust gases flow straight, and upstream-side cellular walls demarcating the upstream-side straight cells.

7 Claims, 5 Drawing Sheets

FOREIGN PATENT DOCUMENTS

| | | |
|---|---|---|
| JP | A 08-508199 | 9/1996 |
| JP | A 9-32539 | 2/1997 |
| JP | A 9-220423 | 8/1997 |
| JP | A 2001-295625 | 10/2001 |
| WO | WO 94/022556 | 10/1994 |
| WO | WO 02/25072 A1 | 3/2002 |
| WO | WO 03/014545 A1 | 2/2003 |

* cited by examiner

Exhaust Gases →

FILTER CATALYST FOR PURIFYING EXHAUST GASES

BACKGROUND OF THE INVENTION

1. Field of the Invention

The present invention relates to a filter catalyst for purifying exhaust gases, such as those emitted from diesel engines and including particulates.

2. Description of the Related Art

Regarding gasoline engines, harmful components in the exhaust gases have been reduced securely by the strict regulations on the exhaust gases and the technological developments capable of coping with the strict regulations. However, regarding diesel engines, the regulations and the technological developments have been advanced less compared to those of gasoline engines because of the unique circumstances that the harmful components are emitted as particulates (i.e., particulate materials, such as carbonaceous fine particles, sulfuric fine particles like sulfates, and high-molecular weight hydrocarbon fine particles, hereinafter collectively referred to as "PMs").

As exhaust-gas purifying apparatuses having been developed so far for diesel engines, the following have been known. For example, the exhaust-gas purifying apparatuses can be roughly divided into trapping (or wall-flow) exhaust-gas purifying apparatuses and open (or straight-flow) exhaust-gas purifying apparatuses. Among these, clogged honeycomb structures made from ceramic (i.e., diesel PMs filters, hereinafter referred to as "DPFs") have been known as one of the trapping exhaust-gas purifying apparatuses. In the DPFs, the honeycomb structures are clogged at the opposite openings of cells in a checkered manner alternately, for instance. The DPFs comprise inlet cells clogged on the downstream side of exhaust gases, outlet cells neighboring the inlet cells and clogged on the upstream side of the exhaust gases, and filter cellular walls demarcating the inlet cells and the outlet cells. In the DPFs, the exhaust gases are filtered by the pores of the filter cellular walls to collect PMs.

In the DPFs, however, the pressure loss increases as PMs deposit thereon. Accordingly, it is needed to regularly remove deposited PMs to recover the DPFs by certain means. Hence, when the pressure loss increases, deposited PMs have been burned with burners or electric heaters conventionally, thereby recovering the DPFs. However, in this case, the greater the deposition of PMs is, the higher the temperature increases in burning deposited PMs. Consequently, there might arise cases that the DPFs are damaged by thermal stress resulting from such burning.

Hence, continuously regenerative DPFs have been developed recently. In the continuously regenerative DPFs, a coating layer comprising alumina is formed on the surface of the filter cellular walls of the DPFs, and a catalytic ingredient such as platinum (Pt) is loaded on the coating layer. In accordance with the continuously regenerative DPFs, since the collected PMs are oxidized and burned by the catalytic reaction of the catalytic ingredient, it is possible to regenerate the DPFs by burning PMs simultaneously with or successively after collecting PMs. Moreover, since the catalytic reaction occurs at relatively low temperatures, and since PMs can be burned when they are collected less, the continuously regenerative DPFs produce an advantage that the thermal stress acting onto the DPFs is so less that the DPFs are inhibited from being damaged.

For example, Japanese Unexamined Patent Publication (KOKAI) No. 9-220,423 discloses such a continuously regenerative DPF whose filter cellular wall exhibits a porosity of from 40 to 60% and an average pore diameter of from 5 to 35 μm, and whose coating layer is formed of a porous oxide. In the porous oxide, particles whose particle diameter is less than the average pore diameter of the filter cellular wall occupy 90% by weight or more. When such a porous oxide with a large specific surface area is coated on DPFs, it is possible to form the coating layer not only on the surface of the filter cellular walls but also on the inner surface of the pores. Moreover, when the coating layer is coated in a fixed amount, it is possible to make the thickness of the coating layer thinner. Accordingly, it is possible to inhibit the pressure loss from enlarging.

Moreover, Japanese Unexamined Patent Publication (KOKAI) No. 6-159,037 discloses a continuously regenerative DPF whose coating layer is further loaded with an $NO_x$-sorbing member. With the arrangement, $NO_x$ can be sorbed in the $NO_x$-sorbing member. Consequently, when a reducing agent such as light oil is sprayed onto the coating layer, it is possible to reduce the sorbed $NO_x$ to purify.

However, at the inlet end surface of DPFs, the openings of the inlet cells and the clogged outlet cells exist in a neighboring manner. Therefore, the opening ratio is so small that it is 50% or less at the inlet end surface. Accordingly, there arises a disadvantage that PMs and ashes are likely to deposit on the clogged outlet cells. Moreover, when DPFs are operated continuously under the condition that the inlet gas temperature is low, or when a reducing gas is kept to be sprayed to reduce the $NO_x$ sorbed in the $NO_x$-sorbing member, the layer of the deposited PMs and ashes has grown from the clogged openings of the outlet cells to the openings of the inlet cells to close the openings of the inlet cells. Consequently, the back pressure might increase to lower the output power of diesel engines. In particular, when a reducing agent such as light oil is sprayed, the openings of the inlet cells are more likely to be closed because the liquid particles collide with the inlet end surface of DPFs directly.

Moreover, continuously regenerative DPFs have a problem with the limited activity. Specifically, it is impossible to increase the loading amount of catalytic ingredient because the coating amount of the coating layer is limited in view of the pressure loss. On the other hand, when a large amount of catalytic ingredient is loaded on a thin loading layer, the loading density of catalytic ingredient is enlarged so that the granular growth of catalytic ingredient occurs at high temperatures. As a result, continuously regenerative DPFs are deteriorated in terms of the durability.

Hence, as set forth in Japanese Unexamined Patent Publication (KOKAI) No. 9-032,539, for example, it is possible to think of disposing a straight-flow oxidizing catalyst on an upstream side with respect to DPFs. With such an arrangement, the oxidizing catalyst oxidizes gaseous hydrocarbons (HC), carbon monoxide (CO) and liquid soluble organic fractions (SOF), and further turns NO into $NO_2$ which is then sorbed in an $NO_x$-sorbing member. Accordingly, the exhaust-gas temperature increases so that the conversions of PMs and $NO_x$ are improved. Moreover, in DPFs, the oxidizing catalyst turns reducing agents into gas. Consequently, liquid particles do not collide directly with the inlet end surface of DPFs. Therefore, it is possible to inhibit the openings of the inlet cells of DPFs from being closed.

However, most of PMs pass through the oxidizing catalyst as they are. Accordingly, PMs have deposited on the inlet end surface of DPFs in not a small amount. It is impossible to fundamentally solve the problem. Moreover, when a casing accommodating DPFs therein is limited in terms of the length, it is necessary to shorten the length of the oxidizing catalyst or DPFs. However, the oxidizing catalyst or DPFs with a shortened length cannot be assembled with casings with secured accuracy, and suffer from poor reliability in terms of the strength.

SUMMARY OF THE INVENTION

The present invention has been developed in view of such circumstances. It is therefore an object of the present invention to inhibit PMs from depositing on the inlet end surface of DPFs, and to further improve purifying activities at the same time.

A filter catalyst for purifying exhaust gases according to the present invention can achieve the aforementioned object. The present filter catalyst is for purifying exhaust gases emitted from internal combustion engines and including particulates, and comprises:

a wall-flow honeycomb structure including:
inlet cells clogged on the downstream side of the exhaust gases;
outlet cells neighboring the inlet cells, and clogged on the upstream side of the exhaust gases;
filter cellular walls demarcating the inlet cells and the outlet cells, and having pores; and
a catalytic layer formed on at least one surface selected from the group consisting of the surface of the filter cellular walls and the surface of the pores of the filter cellular walls; and
an upstream-side straight honeycomb structure disposed on the upstream side of the exhaust gases with respect to the wall-flow honeycomb structure, provided integrally with the wall-flow honeycomb structure, and including:
upstream-side straight cells in which the exhaust gases flow straight; and
upstream-side cellular walls demarcating the upstream-side straight cells.

Further, an oxidizing catalytic layer can desirable be formed on the surface of the upstream-side cellular walls. Furthermore, the upstream-side straight cells can desirably face the end surface of the filter cellular walls, and the filter catalyst can desirably further comprise a ramp extending from the upstream-side cellular walls in a tapered manner, connecting the upstream-side cellular walls with the filter cellular walls and leading the exhaust gases to the inlet cells. Moreover, the ramp can desirably be an upstream-side end surface of the clogged outlet cells which are formed by deforming the filter cellular walls.

In addition, the present filter catalyst can desirably further comprise a downstream-side straight-flow honeycomb structure disposed on the downstream side of the exhaust gases with respect to the wall-flow honeycomb structure, provided integrally with the wall-flow honeycomb structure, and including;

downstream-side straight cells in which the exhaust gases flow straight; and
downstream-side cellular walls demarcating the downstream-side straight cells, and provided with an $NO_x$ sorbing-and-reducing catalytic layer.

Specifically, in accordance with the present filter catalyst, it is possible to inhibit PMs from depositing on the inlet end surface of the wall-flow honeycomb structure. Accordingly, it is possible to inhibit the pressure loss from enlarging. Moreover, the wall-flow honeycomb structure is upgraded in terms of the warm-up property, and consequently it is improved in terms of the PM-oxidizing activity. In addition, the upstream-side straight-flow honeycomb structure has an enlarged opening area or a fully opened end surface so that it is possible to reduce the diameter of the cells to enlarge the specific surface area. Consequently, the upstream-side straight-flow honeycomb structure is provided with an enlarged contacting area with respect to exhaust gases so that the activities are upgraded. Simultaneously therewith, the loading density of catalytic ingredient is lowered so that the granular growth of catalytic ingredient is inhibited at high temperatures. Thus, the durability of catalytic ingredient is enhanced.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Figure 1:
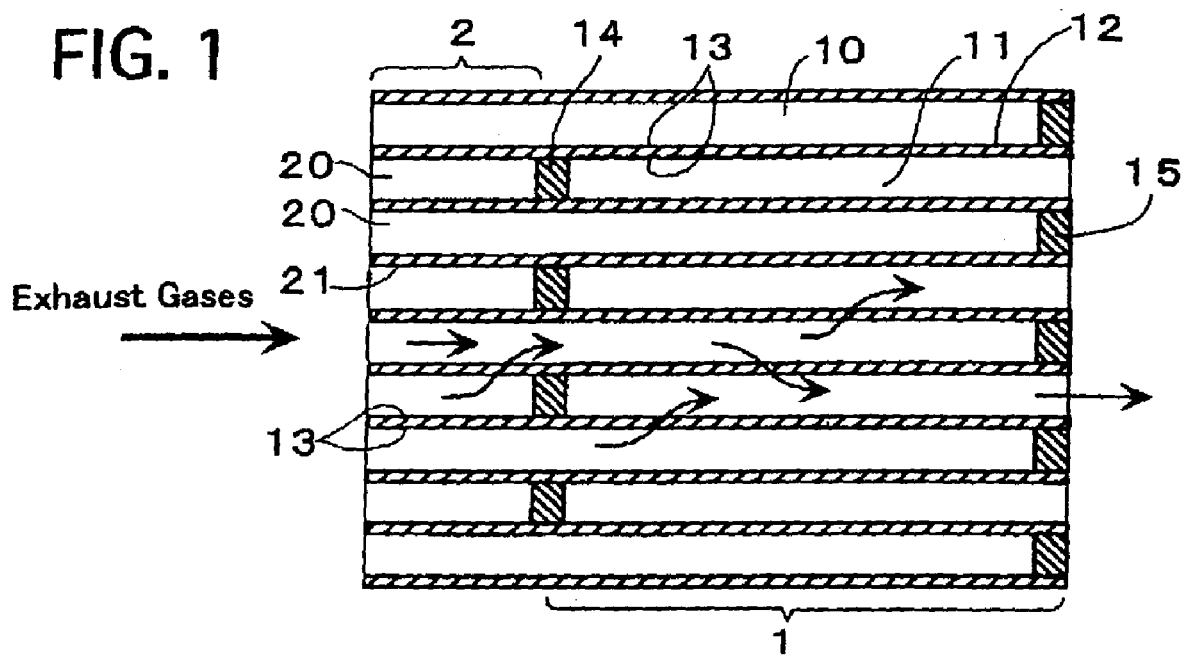
FIG. 1 is a major cross-sectional view of a filter catalyst according to Example No. 1 of the present invention.

Having generally described the present invention, a further understanding can be obtained by reference to the specific preferred embodiments which are provided herein for the purpose of illustration only and not intended to limit the scope of the appended claims.

In the present filter catalyst, the upstream-side straight-flow honeycomb structure is disposed on an upstream side of the exhaust gases with respect to the wall-flow honeycomb structure, and is provided integrally with the wall-flow honeycomb structure. When the upstream-side straight-flow honeycomb structure and wall-flow honeycomb structure are disposed independently of each other, it is inevitable that gaps occur between them. As a result, the heat of the exhaust gases escape through the gaps. However, in the present filter catalyst, the upstream-side straight-flow honeycomb structure and wall-flow honeycomb structure are integral. Accordingly, the thermal conductivity of the present filter catalyst is improved so that the heat of the exhaust gases conducts smoothly from the upstream-side straight-flow honeycomb structure to the wall-flow honeycomb structure. Therefore, the wall-flow honeycomb structure can be warmed up so quickly that the catalytic layer can show the catalytic activities promptly.

Moreover, when the upstream-side straight cells are disposed, for example, coaxially with the inlet cells, the exhaust gases flowing straight in the upstream-side straight cells flow into the inlet cells as they are. Therefore, PMs are inhibited from depositing at the openings of the inlet cells so that the pressure loss is inhibited from enlarging. In addition, even when the inlet temperature of the exhaust gases drops to deposit PMs at the inlet cells, the wall-flow honeycomb structure can exhibit a high warmth-retaining property because it is provided integrally with the upstream-side straight-flow honeycomb structure. Accordingly, it is possible to burn the deposited PMs. Consequently, it is possible to inhibit the openings of the inlet cells from being closed by PMs. Note that, in this arrangement, the upstream-side straight cells face the clogged outlet cells as well. Accordingly, it is inevitable that PMs deposit more or less at the clogged openings of the outlet cells. However, when the exhaust gases with high temperatures are flowed, it is possible to burn the deposited PMs. Since the wall-flow honeycomb structure is likely to be warmed up as described above so that the wall-flow honeycomb structure can exhibit a high warmth-retaining property, it is possible to burn PMs with ease.

In addition, if the clogged outlet cells of the wall-flow honeycomb structure are exposed to the end surface of the filter catalyst structure, the clogged outlet cells might be damaged when the filter catalyst structure is handled or when it is subjected to vibrations. If such is the case, it is difficult to remove PMs because the exhaust gases flow into the wall-flow honeycomb structure through the-damaged clogged cells and are eventually emitted to the outside as they are. However, in the present filter catalyst, the upstream-side straight-flow honeycomb structure is disposed on an upstream side with respect to the wall-flow honeycomb structure to integrally continue from the wall-flow honeycomb structure. Thus, the clogged outlet cells of the wall-flow honeycomb structure are not exposed at all. Accordingly, it is possible to securely inhibit the deterioration of PMs-purifying activity which results from the damaged clogged outlet cells.

The upstream-side straight cells can desirably face the end surface of the filter cellular walls, and the filter catalyst can desirably further comprise a ramp extending from the upstream-side cellular walls in a tapered manner, connecting the upstream-side cellular walls with the filter cellular walls and leading the exhaust gases to the inlet cells. With such an arrangement, it is possible to smoothly lead the exhaust gases flowing into the upstream-side straight cells to the inlet cells. Thus, it is possible to inhibit PMs from depositing at the clogged outlet cells.

The ramp can desirably be an upstream-side end surface of the clogged outlet cells which are formed by deforming the filter cellular walls. When the ramp is an upstream-side end surface of the clogged outlet cells which are formed by deforming the filter cellular walls, it is possible to flow the exhaust gases through the ramp and to filter PMs at the ramp as well. Although the upstream-side end surface of the clogged outlet cells is turned into the ramp, the heat capacity of the ramp is equal to that of the filter cellular walls and is smaller than that of conventional clogging plugs. Thus, the wall-flow honeycomb structure is improved in terms of the warm-up characteristic. Therefore, the present filter catalyst is upgraded in terms of the activity when it purifies PMs deposited at the ramp by oxidation.

It is further desirable that an oxidizing catalytic layer can be formed on the surface of the upstream-side cellular walls. With the oxidizing catalytic layer, it is possible to oxidized and purify HC and CO included in the exhaust gases which flow straight in the upstream-side straight cells. Further, the oxidizing catalytic layer generates heat in the oxidation and purification so that it is possible to furthermore facilitate to warm up the wall-flow honeycomb structure. Furthermore, when an $NO_x$-sorbing member is loaded on the catalytic layer of the wall-flow honeycomb structure, it is possible to sorb $NO_2$, which is generated by the oxidation at the oxidizing catalytic layer, in the $NO_x$-sorbing member. Accordingly, the present filter catalyst is furthermore improved in terms of the activity when it purifies $NO_x$. Moreover, when a reducing agent such as light oil is sprayed, the reducing agent vaporizes at the upstream-side straight cells, and flows into the wall-flow honeycomb structure. In addition, since the wall-flow honeycomb structure is likely to be warmed up as described above, the wall-flow honeycomb structure is upgraded in terms of the $NO_x$ reduction activity.

The filter catalyst can further comprise a downstream-side straight-flow honeycomb structure disposed on the downstream side of the exhaust gases with respect to the wall-flow honeycomb structure, provided integrally with the wall-flow honeycomb structure, and including: downstream-side straight cells in which the exhaust gases flow straight; and downstream-side cellular walls demarcating the downstream-side straight cells. In this instance, it is desirable that the downstream-side cellular walls can be provided with an $NO_x$ sorbing-and-reducing catalytic layer. When a reducing agent such as light oil is sprayed, the reducing gas is subjected to catalytic action at the catalytic layer of the wall-flow honeycomb structure to generate active reformed HC, and the resulting reformed HC flow into the downstream-side straight cells. Moreover, the catalytic layer generates reaction heat to furthermore increase the temperature of the exhaust gases flowing into the downstream-side straight cells. Therefore, the $NO_x$ reduction activity of the $NO_x$ sorbing-and-reducing catalytic layer is improved. In addition, the pressure loss is not enlarged so much at the downstream-side straight cells even when the loading amount of the $NO_x$ sorbing-and-reducing catalytic layer is enlarged. Thus, it is possible to lower the loading density of the noble metal and $NO_x$-sorbing member to upgrade the durability of the $NO_x$ sorbing-and-reducing catalyst.

It is possible to manufacture the wall-flow honeycomb structure and upstream-side straight-flow honeycomb structure, or the downstream-side straight-flow honeycomb structure, out of heat-resistant ceramics such as cordierite. The wall-flow honeycomb structure and upstream-side straight-flow honeycomb structure can be made integral in the following manner. First, a straight honeycomb-shaped structure is formed by extrusion forming. Outlet cells are formed by clogging at inner positions with respect to one of the opposite end surfaces of the straight honeycomb-shaped structure. Inlet cells are formed by clogging the other one of the opposite end surfaces. Finally, the thus clogged straight honeycomb-shaped structure is calcined. Alternatively, green compacts of the wall-flow honeycomb structure and upstream-side straight-flow honeycomb structure which are clogged for DPF applications can be joined by calcining them with the end surfaces butting to each other.

At least the filter cellular walls of the wall-flow honeycomb structure can preferably exhibit a porosity of from 40 to 80% and an average pore diameter of from 10 to 40 μm. It is especially desirable that the porosity can fall in a range of from 60 to 75% and the average pore diameter can fall in a range of from 22 to 35 μm. With such an arrangement, it is possible to efficiently collect PMs. At the same time, it is possible to inhibit the pressure loss from enlarging even when the catalytic layer is formed in an amount of from 100 to 200 g with respect to 1 L of the wall-flow honeycomb structure. The pores can be formed in the filter cellular walls as hereinafter described. For example, a combustible powder, such as carbon powders, wood powders, starch and polymers, is mixed into a slurry whose major component is a cordierite powder. The slurry is processed into a workpiece by forming. When the formed workpiece is calcined, the combustible powder disappears to form the pores. Moreover, it is possible to control the porosity and average pore diameter of the filter cellular walls by controlling the particle diameter and used amount of the combustible powder.

The catalytic layer formed on the filter cellular walls of the wall-flow honeycomb structure comprises a porous oxide, and a catalytic ingredient loaded on the porous oxide. As for the porous oxide, it is possible to use at least one oxide selected from the group consisting of $Al_2O_3$, $ZrO_2$, $CeO_2$, $TiO_2$ and $SiO_2$, or a composite oxide comprising a plurality of the oxides.

It is desirable that the catalytic layer can be formed not only on the surface of the filter cellular walls of the wall-flow honeycomb structure but also on the surface of the pores which are formed by the disappearing combustible powder.

The catalytic layer formed on the filter cellular walls of the wall-flow honeycomb structure can preferably be coated in an amount of from 100 to 200 g with respect to 1 L of the wall-flow honeycomb structure. When the catalytic layer is coated in an amount of less than 100 g with respect to 1 L of the wall-flow honeycomb structure, it is inevitable that the durability of the catalytic activities lowers. When catalytic layer is coated in an amount of more than 200 g with respect to 1 L of the wall-flow honeycomb structure, it is unpractical because such catalytic layers heighten the pressure loss excessively.

The catalytic layer can be formed in the following manner. An oxide powder or a composite oxide powder is made into a slurry together with a binder component, such as an alumina sol, and water. The resulting slurry is deposited on the filter cellular walls, and is thereafter calcined. When the slurry is deposited on the filter cellular walls, it is possible to use ordinary immersion methods. However, it is desirable to remove the slurry which enters the pores in excess by air blowing or suction.

As for the catalytic ingredient loaded on the catalytic layer, it is possible to use catalytic ingredients which can reduce $NO_x$ by catalytic reaction, and which can promote the oxidation of PMs. However, it is preferable to load one or more members selected from the group consisting of platinum-group noble metals, such as Pt, Rh and Pd, on the catalytic layer. It is preferable to further load an $NO_x$-sorbing member on the catalytic layer. The loading amount of the noble metal can preferably fall in a range of from 2 to 8 g with respect to 1 L of the wall-flow honeycomb structure. When the loading amount is less than 2 g with respect to 1 L of the wall-flow honeycomb structure, the purifying activities of the resulting catalytic layers are too less to be practical. When the noble metal is loaded more than 8 g with respect to 1 L of the wall-flow honeycomb structure, the activities of the resulting catalytic layers have saturated, and at the same time the material cost has gone up.

The noble metal can be loaded on the catalytic layer as described below. The noble metal is loaded on the catalytic layer comprising an oxide powder or a composite oxide powder by adsorption loading methods or absorption loading methods with a solution in which a salt of the noble metal, such as a nitrate thereof, is solved. Alternatively, the noble metal can be loaded on an oxide powder or a composite oxide powder in advance. Then, the catalytic layer can be formed with the resulting catalytic powder.

As for the $NO_x$-sorbing member loaded on the catalytic layer, it is possible to use at least one member selected from the group consisting of alkali metals, alkaline-earth metals and rare-earth elements. The alkali metals can be K, Na, Cs and Li. The alkaline-earth metals can be Ba, Ca, Mg and Sr. The rare-earth elements can be Sc, Y, Pr and Nd. Among them, it is desirable to use at least one member selected from the group consisting of alkali metals and alkaline-earth metals which are good in terms of the $NO_x$-sorbing ability.

The loading amount of the $NO_x$-sorbing member can preferably fall in a range of from 0.25 to 0.45 mol with respect to 1 L of the wall-flow honeycomb structure. When the loading amount is less than 0.25 mol with respect to 1 L of the wall-flow honeycomb structure, the purifying activities of the resulting catalytic layers are too less to be practical. When the $NO_x$-sorbing member is loaded more than 0.45 mol with respect to 1 L of the wall-flow honeycomb structure, the $NO_x$-sorbing member covers the noble metal to degrade the activities of the resulting catalytic layers.

The $NO_x$-sorbing member can be loaded on the catalytic layer in the following manner. The $NO_x$-sorbing member is loaded on the catalytic layer by absorption loading methods with a solution in which an acetate or nitrate of the $NO_x$-sorbing member is solved. Alternatively, the $NO_x$-sorbing member can be loaded on an oxide powder or a composite oxide powder in advance. Then, the catalytic layer can be formed with the resulting powder.

The upstream-side straight-flow honeycomb structure and the downstream-side straight flow honeycomb structure can be formed of heat-resistant ceramics such as cordierite in the same manner as the wall-flow honeycomb structure. In order to enhance the integrity with the wall-flow honeycomb structure, it is desirable that the upstream-side straight-flow honeycomb structure and downstream-side straight-flow honeycomb structure can be formed of the same material as that of the wall-flow honeycomb structure.

It is not necessary to form pores in the upstream-side cellular walls of the upstream-side straight-flow honeycomb structure and the downstream-side cellular walls of the downstream-side straight-flow honeycomb structure because they are not required to collect PMs. However, the upstream-side cellular walls and the downstream-side cellular walls can exhibit a porosity, an average particle diameter or a pore diameter distribution which is identical with that of the filter cellular walls of the wall-flow honeycomb structure.

The oxidizing catalyst formed on the surface of the upstream-side cellular walls comprises a porous oxide, and a noble metal loaded on the porous oxide. It is preferable to form the oxidizing catalyst in an amount of from 100 to 300 g with respect to 1 L of the upstream-side straight-flow honeycomb structure. As for the porous oxide, it is possible to use at least one oxide selected from the group consisting of $Al_2O_3$, $ZrO_2$, $CeO_2$, $TiO_2$ and $SiO_2$, or a composite oxide comprising a plurality of the oxides. As for the noble metal loaded on the porous oxide, it is possible to use noble metals which can promote the oxidation reaction of PMs. However, it is preferable to load one or more members selected from the group consisting of platinum-group noble metals, such as Pt, Rh and Pd, on the porous oxide. The loading amount of the noble metal can preferably fall in a range of from 0.1 to 10 g with respect to 1 L of the upstream-side straight-flow honeycomb structure. When the loading amount is less than 0.1 g with respect to 1 L of the upstream-side straight-flow honeycomb structure, the purifying activities of the resulting oxidizing catalysts are too less to be practical. When the noble metal is loaded more than 10 g with respect to 1 L of the upstream-side straight-flow honeycomb structure, the activities of the resulting oxidizing catalysts have saturated, and at the same time the material cost has gone up. Note that an $NO_x$-sorbing member can be further loaded on the oxidizing catalyst.

The $NO_x$-sorbing-and-reducing catalytic layer formed on the surface of the downstream-side cellular walls comprises a porous oxide, a noble metal loaded on the porous oxide, and an $NO_x$-sorbing member loaded on the porous oxide. It is preferable to form the $NO_x$-sorbing-and-reducing catalytic layer in an amount of from 200 to 300 g with respect to 1 L of the downstream-side straight-flow honeycomb structure. As for the porous oxide, it is possible to use at least one oxide selected from the group consisting of $Al_2O_3$, $ZrO_2$, $CeO_2$, $TiO_2$ and $SiO_2$, or a composite oxide comprising a plurality of the oxides. Note that the loading of the noble metal and $NO_x$-sorbing member can be carried out in the same manner as the catalytic layer is loaded on the filter cellular walls of the wall-flow honeycomb structure.

As for the noble metal loaded on the porous oxide, it is possible to use noble metals which can promote the reduction reaction of $NO_x$. However, it is preferable to load one or more members selected from the group consisting of platinum-group noble metals, such as Pt, Rh and Pd, on the porous oxide. The loading amount of the noble metal can preferably fall in a range of from 0.1 to 10 g with respect to 1 L of the downstream-side straight-flow honeycomb structure. When the loading amount is less than 0.1 g with respect to 1 L of the downstream-side straight-flow honeycomb structure, the purifying activities of the resulting $NO_x$-sorbing-and-reducing catalytic layer are too less to be practical. When the noble metal is loaded more than 10 g with respect to 1 L of the downstream-side straight-flow honeycomb structure, the activities of the resulting $NO_x$-sorbing-and-reducing catalytic layer have saturated, and at the same time the material cost has gone up.

As for the $NO_x$-sorbing member loaded on the $NO_x$-sorbing-and-reducing catalytic layer, it is possible to use at least one member selected from the group consisting of alkali metals, alkaline-earth metals and rare-earth elements. The alkali metals can be K, Na, Cs and Li. The alkaline-earth metals can be Ba, Ca, Mg and Sr. The rare-earth elements can be Sc, Y, Pr and Nd. Among them, it is desirable to use at least one member selected from the group consisting of alkali metals and alkaline-earth metals which are good in terms of the $NO_x$-sorbing ability.

The loading amount of the $NO_x$-sorbing member can preferably fall in a range of from 0.25 to 0.45 mol with respect to 1 L of the downstream-side straight-flow honeycomb structure. When the loading amount is less than 0.25 mol with respect to 1 L of the downstream-side straight-flow honeycomb structure, the purifying activities of the resulting $NO_x$-sorbing-and-reducing catalytic layers are too less to be practical. When the $NO_x$-sorbing member is loaded more than 0.45 mol with respect to 1 L of the downstream-side straight-flow honeycomb structure, the $NO_x$-sorbing member covers the noble metal to degrade the activities of the resulting $NO_x$-sorbing-and-reducing catalytic layers.

Note that the number of the cells in the upstream-side straight-flow honeycomb structure and the number of the cells in the downstream-side straight-flow honeycomb structure can be identical with or different from the number of the cells in the wall-flow honeycomb structure. However, it is desirable that the number of the cells in the upstream-side straight-flow honeycomb structure and the number of the cells in the downstream-side straight-flow honeycomb structure can be more than the number of the cells in the wall-flow honeycomb structure. When the number of the cells is thus increased, it is possible to enlarge the specific surface area of the oxidizing catalytic layer or $NO_x$-sorbing-and-reducing catalytic layer. As a result, the activities of the present filter catalyst can be improved. Moreover, the durability of the present filter catalyst can be upgraded because the loading density of the catalytic ingredient can be lowered so that the granular growth of the catalytic ingredient is inhibited. In addition, even when the number of the cells is thus increased, the pressure loss is hardly enlarged because the exhaust gases flow straight in the upstream-side straight-flow honeycomb structure and downstream-side straight-flow honeycomb structure.

EXAMPLES

The present filter catalyst will be hereinafter described in more detail with reference to specific embodiments.

Example No. 1

FIG. 1 illustrates a major cross-sectional view of a filter catalyst for purifying exhaust gases according to Example No. 1 of the present invention. The filter catalyst comprises a wall-flow honeycomb structure 1, and an upstream-side straight-flow honeycomb structure 2. The upstream-side straight-flow honeycomb structure 2 is disposed on an upstream side of exhaust gases with respect to the wall-flow honeycomb structure 1, and is formed integrally with the wall-flow honeycomb structure 1.

The wall-flow honeycomb structure 1 comprises inlet cells 10, outlet cells 11, filter cellular walls 12, and a catalytic layer 13. The inlet cells 10 are clogged on an downstream side of the exhaust gases. The outlet cells 11 neighbor the inlet cells 10, and are clogged on an upstream side of the exhaust gases. The filter cellular walls 12 demarcate the inlet cells 10 and outlet cells 11. The catalytic layer 13 is formed on the surface of the filter cellular walls 12. Moreover, the upstream-side straight-flow honeycomb structure 2 comprises upstream-side straight cells 20, upstream-side cellular walls 21, and a catalytic layer 13. The upstream-side cellular walls 21 demarcate the upstream-side straight cells 20. The catalytic layer 13 is formed on the surface of the upstream-side cellular walls 21

A production process of the filter catalyst according to Example No. 1 will be hereinafter described instead of the detailed description on the arrangement.

A straight honeycomb-shaped substrate was prepared. The substrate had a diameter of 129 mm, a length of 160 mm and a volume of about 2,100 cc, and comprised square-shaped cells in a quantity of 300 cells/inch$^2$. Note that the substrate exhibited a porosity of 65%, and had pores whose average pore diameter was 30 μm.

Next, a powder was prepared which comprised alumina, talc, kaoline and silica to make the cordierite composition. The powder was mixed with predetermined amounts of an organic binder and water to prepare a creamy paste with stable shape-retaining property. With the resulting paste, intermediate plugs 14 were formed alternately by a paste injector (or dispenser) to clog every other cells at an inner position with respect to the upstream-side end surface of the substrate by 10 mm. Meanwhile, at the downstream-side end surface of the substrate, end-surface plugs 15 were formed to clog the cells which were not plugged by the intermediate plugs 14. The substrate was thereafter calcined at 1,400° C. Thus, the inlet cells 10, the outlet cells 11 and the straight cells 20 were formed.

Subsequently, a slurry was wash coated on the substrate, was dried at 110° C., and was calcined thereafter 450° C., thereby forming a coating layer. The slurry comprised an alumina powder. The coating layer was formed in an amount of 150 g with respect to 1 L of the substrate. Note that the coating layer was formed on the surface of all the filter cellular walls 12 and all the upstream-side cellular walls 21 as well as the surface of the pores. Then, Pt, Li, Ba and K were loaded on the coating layer by an impregnation loading method, respectively. Thus, all the coating layers were turned into catalytic layers 13. Note that Pt was loaded in an amount of 2 g, Li was loaded in an amount of 0.2 mol, Ba was loaded in an amount of 0.1 mol, and K was loaded in an amount of 0.05 mol with respect to 1 L of the substrate, respectively.

In the filter catalyst according to Example No. 1, the exhaust gases first flowed into all of the upstream-side straight cells 20. Since the upstream-side straight cells 20 gave the filter catalyst a large opening area, PMs were less likely to deposit on the upstream-side end surface. Accordingly, in the filter catalyst, the cells were less likely to be closed. Moreover, the gaseous components, such as HC and Co, included in the exhaust gases were oxidized and purified by the catalytic layer 13 formed on the upstream-side straight cells 20.

Then, the exhaust gases flowed into the inlet cells 10, passed through the filter cellular walls 12, and were emitted through the outlet cells 11. In this instance, PMs included in the exhaust gases were collected on the filter cellular walls 12. When the exhaust gases flowed into the upstream-side straight cells 20 provided with the intermediate plug 14, they passed through the upstream-side cellular walls 21, and flowed into the inlet cells 10. In this instance, however, PMs were collected on the intermediate plugs 14 as well as the upstream-side cellular walls 21. The thus collected PMs were oxidized and purified by Pt loaded on the catalytic layer 13.

The heat generated by the oxidation reaction at the upstream-side straight-flow honeycomb structure 2 was conducted to the wall-flow honeycomb structure 1 by way of the exhaust gases as well as the upstream-side cellular walls 21. Thus, it was possible to improve the warmth-retaining property of the intermediate plugs 14 as well as the warm-up property of the wall-flow honeycomb structure 1. Therefore, it was possible to facilitate the combustion of the PMs deposited on the intermediate plugs 14 as well as the upstream-side cellular walls 21. Accordingly, it was possible to inhibit the upstream-side cells 20 from being closed. Moreover, the wall-flow honeycomb structure 1 could be upgraded in terms of the activity when it oxidized PMs. Note that it was confirmed that the temperature at the intermediate plugs 14 rose by 50° C. or more than the temperature at the end surface of the upstream-side straight-flow honeycomb structure 2 when the filter catalyst according to Example No. 1 was installed to an actual exhaust system of diesel engines and was regenerated by warming-up to burn the deposited PMs.

Example No. 2

Except that Pt was loaded on the catalytic layers 13 of the upstream-side straight-flow honeycomb structure 2 in an amount of 5 g with respect to 1 L of the upstream-side straight honeycomb structure 2, and that Li, Ba and K were not loaded thereon, a filter catalyst according to Example No. 2 of the present invention had the same arrangements as those of Example No. 1.

The filter catalyst according to Example No. 2 was improved greatly in terms of the oxidizing activity at the upstream-side straight-flow honeycomb structure 2, compared to Example No. 1. Therefore, it was possible to further improve the warmth-retaining property of the intermediate plugs 14 as well as the warm-up property of the wall-flow honeycomb structure 1.

Example No. 3

Figure 2:
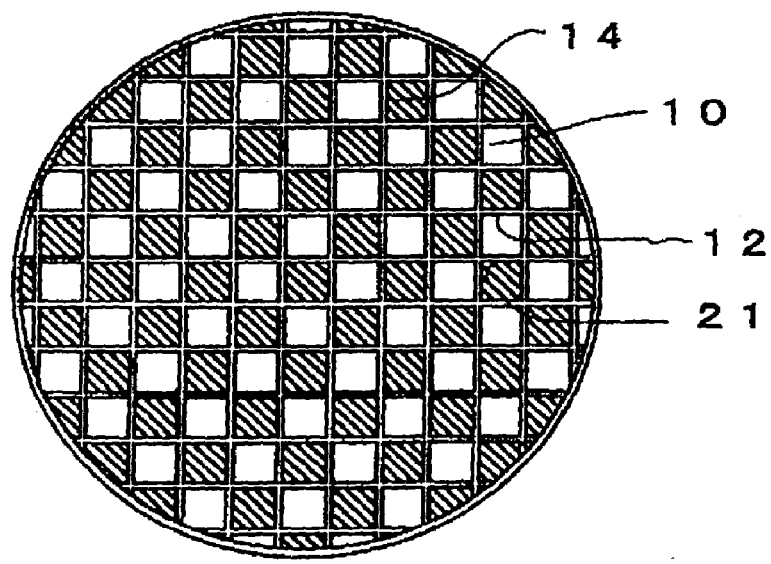
FIG. 2 is a front view of an inlet end surface of a filter catalyst according to Example No. 3 of the present invention.
Figure 3:
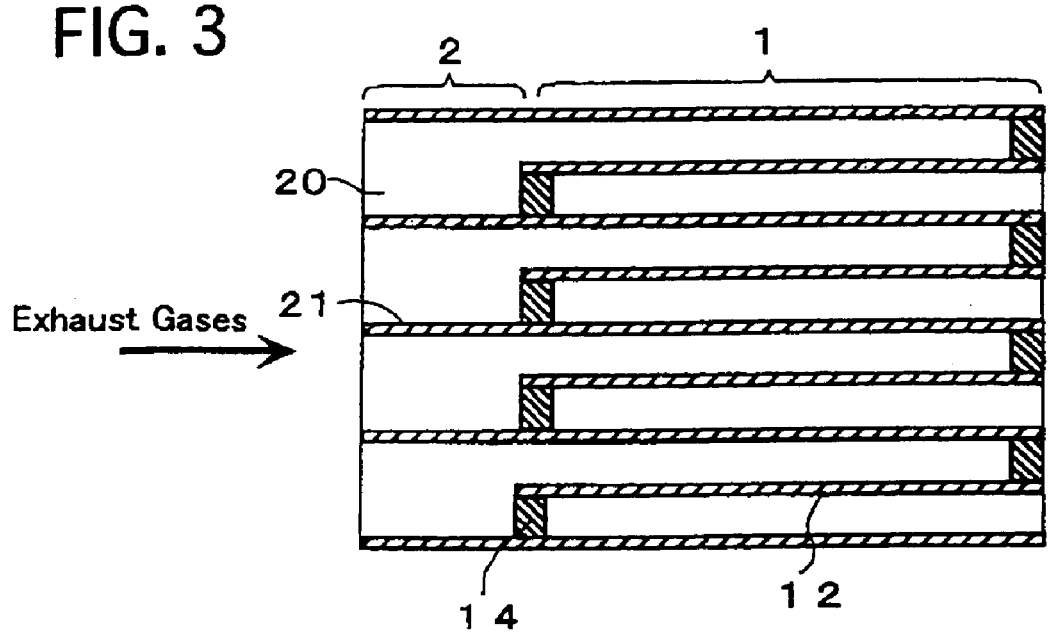
FIG. 3 is a major cross-sectional view of the filter catalyst according to Example No. 3.

FIG. 2 illustrates a front view of an inlet end surface of a filter catalyst according to Example No. 3 of the present invention. FIG. 3 illustrates a major cross-sectional view of the filter catalyst according to Example No. 3. Except that the every other upstream-side cellular walls 21 were cut off up to a position at which the intermediate plugs 14 were disposed, the filter catalyst according to Example No. 2 had the same arrangements as those of Example No. 1.

In the filter catalyst according to Example No. 3, the exhaust gases warmed up by the oxidation reaction at the upstream-side straight-flow honeycomb structure 2 were more likely to contact with the intermediate plugs 14. Moreover, the wall-flow honeycomb structure 1 was opened so greatly on the upstream side with respect to the intermediate plugs 14 that PMs were more unlikely to deposit on the intermediate plugs 14. Therefore, it was possible to furthermore inhibit the upstream-side straight cells 20 from being closed.

In the filter catalyst according to Example No. 3, the intermediate plugs 14 were formed in the same as Example No. 1. Note that, however, it is possible to form the intermediate plugs 14 by pushing the upstream-side cellular walls 21 inward so as to close every other upstream-side straight cells 20 (or outlet cells 11) in the same manner as later-described Example No. 5.

Example No. 4

Figure 4:
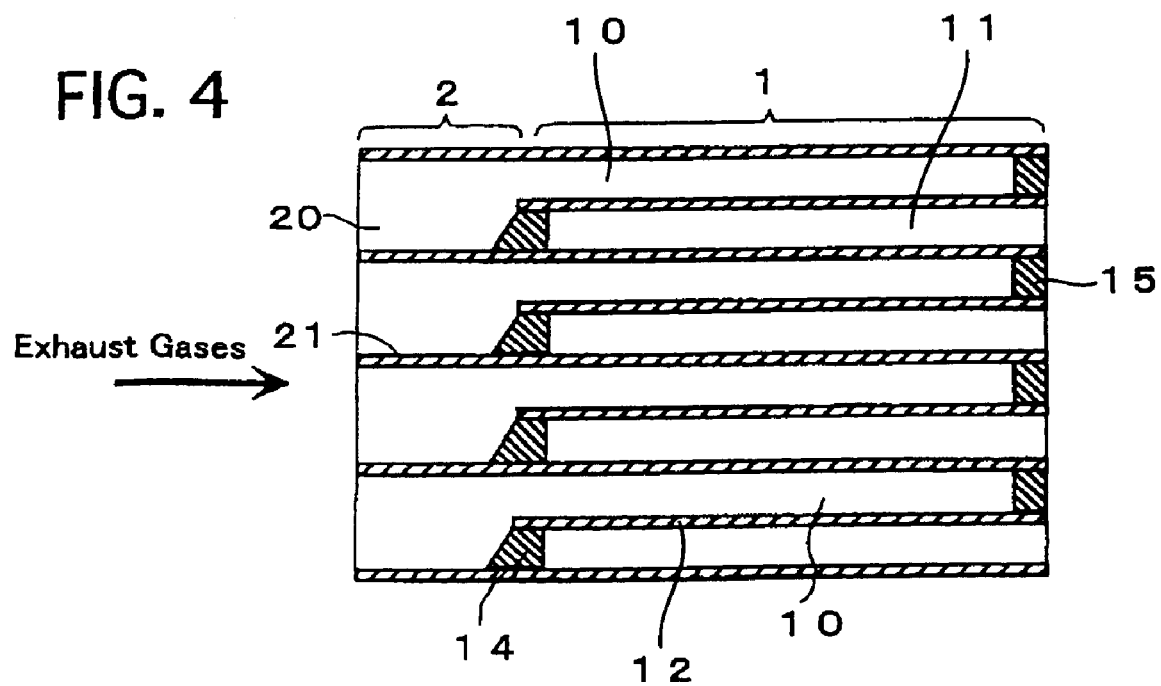
FIG. 4 is a major cross-sectional view of a filter catalyst according to Example No. 4 of the present invention.

FIG. 4 illustrates a major cross-sectional view of a filter catalyst according to Example No. 4 of the present invention. Except that the intermediate plugs 14 were provided with a tapered surface, tapering from wide to narrow in the direction of the exhaust gases toward the inlet cells 10, on the exhaust-gas inlet side, the filter catalyst according to Example No. 4 had the same arrangements as those of Example No. 3.

In the filter catalyst according to Example No. 4, the exhaust gases collided with the intermediate plugs 14 were led by the tapered surface so that the exhaust gases were more likely to flow into the inlet cells 10. Accordingly, it was possible to further inhibit the upstream-side straight cells 20 from being closed. Moreover, it was possible to reduce the pressure loss.

Example No. 5

Figure 5:
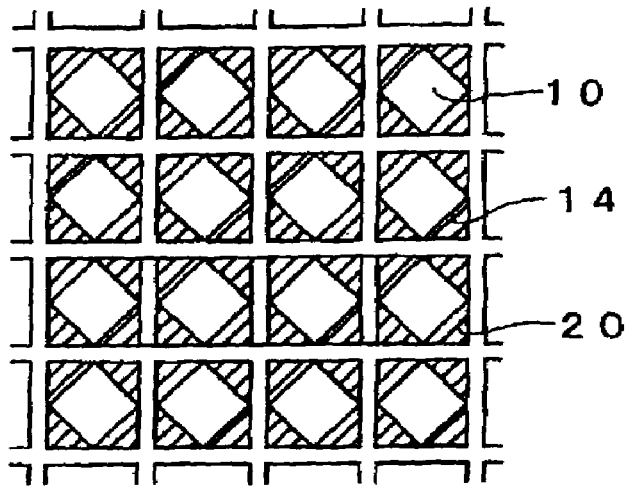
FIG. 5 is a major front view of an inlet end surface of a filter catalyst according to Example No. 5 of the present invention.
Figure 6:
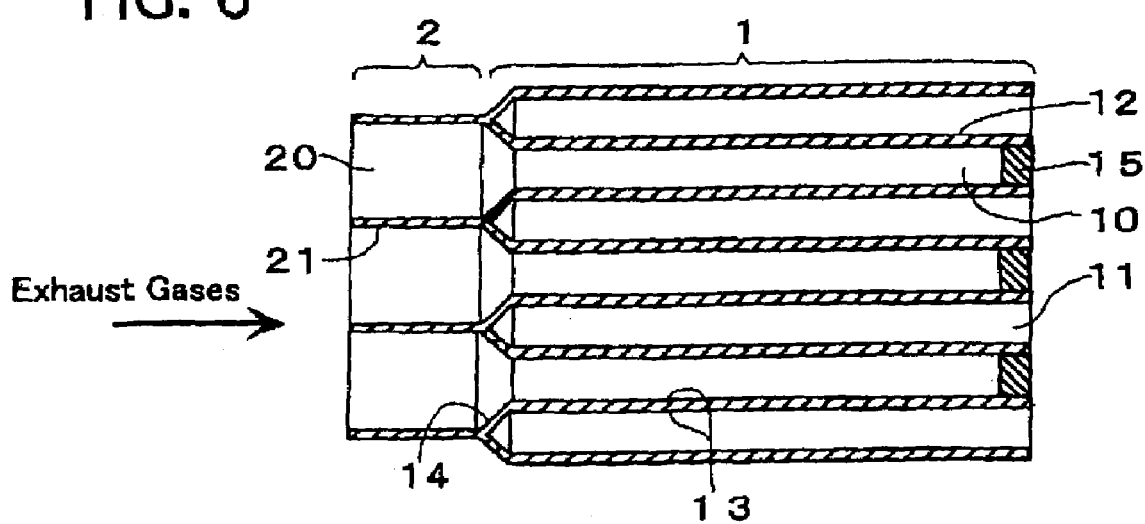
FIG. 6 is a major cross-sectional view of the filter catalyst according to Example No. 5.

FIG. 5 illustrates a front view of an inlet end surface of a filter catalyst according to Example No. 5 of the present invention FIG. 6 illustrates a major cross-sectional view of the filter catalyst according to Example No. 5. Similarly to Example No. 1, the filter catalyst according to Example No. 5 comprises the wall-flow honeycomb structure 1, and the upstream-side straight-flow honeycomb structure 2. The upstream-side straight-flow honeycomb structure 2 is disposed on an upstream side of the exhaust gases-with respect to the wall-flow honeycomb structure 1, and is formed integrally therewith.

The upstream-side straight cells 20 communicate with the inlet cells 10 coaxially. The diameter of the upstream-side straight cells 20 is made greater than that of the inlet cells 10. Moreover, the upstream-side cells 20 also face the intermediate plugs 14. The intermediate plugs 14 are formed of the same material as those of the filter cellular walls 12 and upstream-side cellular walls 21, and are formed as a tapered shape tapering from wide to narrow in the direction of the exhaust gases toward the inlet cells 10. Except the above-described arrangements, the filter catalyst according to Example No. 4 had the same arrangements as those of Example No. 1. Note that the upstream-side honeycomb structure 2 had a length of 12 mm, and the wall-flow honeycomb structure 1 had a length of 138 mm.

The, filter catalyst according to Example No. 5 was manufactured as hereinafter described. A powder was prepared which comprised alumina, talc, kaoline and silica to make the cordierite composition. The powder was mixed with predetermined amounts of an organic binder, water and a carbonaceous powder to prepare a paste. With the resulting paste, a straight honeycomb-shaped green substrate 3 shown in FIG. 7 was formed by extrusion molding. The thus formed green substrate had a diameter of 130 mm and a length of 150 mm, and comprised square-shaped cells in a quantity of 300 cells/inch$^2$.

Figure 7:
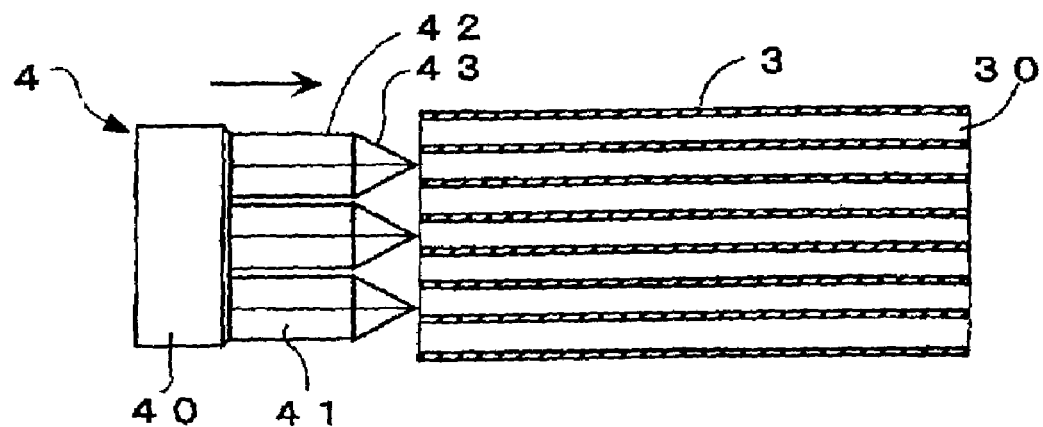
FIG. 7 is a diagram for illustrating how to manufacture the filter catalyst according to Example No. 5.

Meanwhile, as illustrated in FIG. 7, a pressing jig 4 was prepared. The pressing jig 4 was formed as a pin support which comprised a heater unit 40, and a plurality of needles 41 protruding from the heater unit 40. The heater unit 40 could heat the needles 41. Moreover, the needles 41 comprised a straight element 42, and a leading element 43. The straight element 42 had a square-shaped cross-section, and had a length of 12 mm. The leading element 43 was formed at the leading end of the straight element 42, and formed as a pyramidal shape whose height was 3 mm. Note that the length of the cross-sectional side of the straight element 42 and the length of the bottom side of the leading element 43 were enlarged by multiplying the length of the cellular openings of the green substrate 3 by a factor, the square root of 2.

Then, the needles 41 were heated by the heater unit 40, and the heated needles 41 were fitted into the cells of the green substrate 3 by a depth of 15 mm as illustrated in FIG. 7. Accordingly, the green substrate 3 was deformed on the exhaust-gas inlet side of the cells. When the thus deformed green substrate 3 was calcined, the major-diameter upstream-side straight cells 20 as well as the intermediate plugs 14 were formed. Note that the calcined substrate 3 exhibited a porosity of 60%, and had pores whose average pore diameter was 30 µm. Thereafter, end-surface plugs 15 were formed, and subsequently catalytic layers 13 were formed in the same manner as Example No. 1. Thus, the filter catalyst according to Example No. 5 shown in FIG. 6 was manufactured.

In the filter catalyst according to Example No. 5, since the tapered intermediate plugs 14 reduced the resistance exerted to the exhaust gases when the exhaust gases flowed into the inlet cells 10, it was possible to inhibit the pressure loss. Moreover, since the intermediate plugs 14 were made of the same material as that of the filter cellular walls 12 through which gases could permeate, and since the intermediate plugs 14 had a small volume, the intermediate plugs 14 had such a small heat capacity that they were warmed up quickly. As a result, it was possible to furthermore inhibit PMs from depositing on the intermediate plugs 14.

Example No. 6

Figure 8:
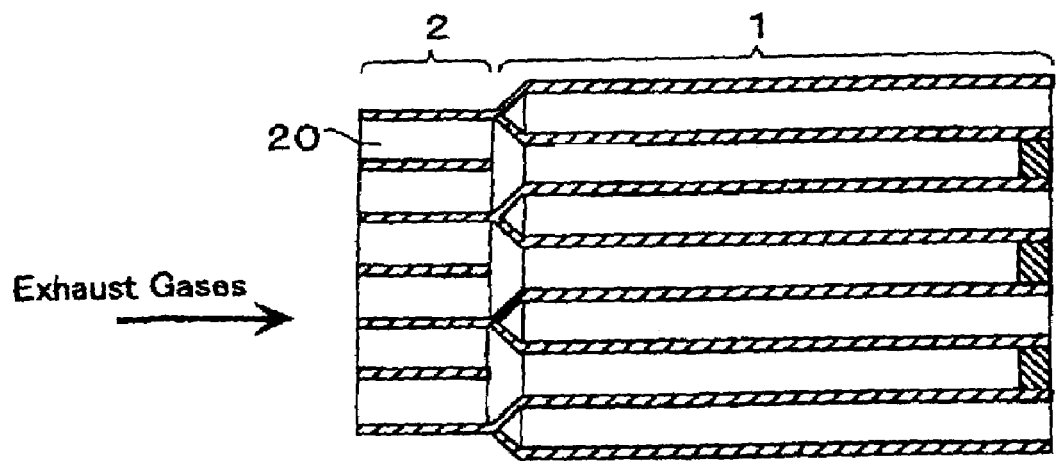
FIG. 8 is a major cross-sectional view of a filter catalyst according to Example No. 6 of the present invention.

FIG. 8 is a major cross-sectional view of a filter catalyst according to Example No. 6 of the present invention. Except that the upstream-side straight cells 20 had a smaller diameter than those of Example No. 5 and were provided in a larger quantity than those of Example No. 5, the filter catalyst according to Example No. 6 had the same arrangements as those of Example No. 5.

When the filter catalyst according to Example No. 6 was manufactured, the same pressing jig as that of Example No. 5 was used, and was fitted into the cells of a green substrate by a depth of 3 mm. Thus, a first green substrate of the wall-flow honeycomb structure 1, which was free from the upstream-side straight cells 20, was formed. Meanwhile, a second green substrate, which made the upstream-side honeycomb structure 2, was formed by extrusion molding. After the first and second green substrates were bonded by pressing, they were calcined. Thereafter, the end-surface plugs 15 were formed, and subsequently the catalytic layers 13 were formed in the same manner as Example No. 1.

In the filter catalyst according to Example No. 6, the upstream-side straight-flow honeycomb structure 2 was provided with a greater superficial area, compared to that of Example No. 5. Accordingly, the oxidation reaction was enhanced at the upstream-side straight-flow honeycomb structure 2, and the reaction heat improved the warm-up property of the wall-flow honeycomb structure 1. Therefore, the wall-flow honeycomb structure 1 was furthermore upgraded in terms of the performance when it oxidized Example No. 7

Figure 9:
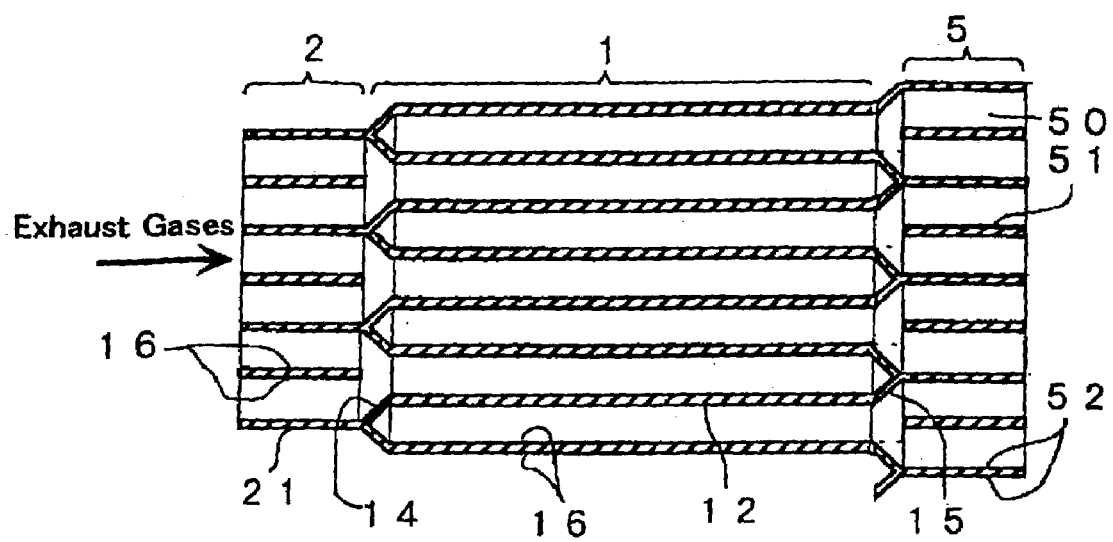
FIG. 9 is a major cross-sectional view of a filter catalyst according to Example No. 7 of the present invention.

FIG. 9 illustrates a major cross-sectional view of a filter catalyst according to Example No. 7 of the present-invention. The filter catalyst is further provided with a downstream-side straight-flow honeycomb structure 5 which is disposed on a downstream side of the exhaust gases with respect to the wall-flow honeycomb structure 1. The downstream-side straight-flow honeycomb structure 5 comprises downstream-side straight cells 50, and downstream-side cellular walls 51 which demarcate the downstream-side straight cells 50.

On the filter cellular walls 12 of the wall-flow honeycomb structure 1 as well as on the upstream-side honeycomb cellular walls 21 of the upstream-side straight-flow honeycomb structure 2, a catalytic layer 16 was formed in an amount of 150 g with respect to 1 L of the wall-flow honeycomb structure 1 and with respect to 1 L of the upstream-side straight-flow honeycomb structure 2, respectively. Note that the catalytic layer 16 comprised a coating layer composed of $Al_2O_3$ and $CeO_2$, and Pt loaded on the coating layer. Moreover, on the downstream-side honeycomb cellular walls 51 of the downstream-side straight-flow honeycomb structure 5, a catalytic layer 52 was formed in an amount of 270 g with respect to 1 L of the downstream-side straight-flow honeycomb structure 5. Note that the catalytic layer 52 comprised a coating layer composed of $Al_2O_3$, $TiO_2$, $ZrO_2$ and $CeO_2$, and Pt loaded on the coating layer. In addition, an $NO_x$-sorbing member comprising Li, Ba and K was further loaded on the catalytic layers 16, 52 which were formed on the filter cellular walls 12 and the downstream-side cellular walls 51. Note that, with respect to 1 L of the wall-flow honeycomb structure 1 or the upstream-side straight-flow honeycomb structure 2 and with respect to 1 L of the downstream-side straight-flow honeycomb structure 5, Pt was loaded in an amount of 2 g, Li was loaded in an amount of 0.2 mol, Ba was is loaded in an amount of 0.1 mol, and K was loaded in an amount of 0.05 mol, respectively.

The filter catalyst according to Example No. 7 was manufactured in the following manner. The pressing jigs 4 are fitted into the cells of a first green substrate making the wall-flow honeycomb structure 1 at the opposite end surfaces of the first green substrate in the same manner as described in Example No. 6. Thereafter, second and third green substrates making the upstream-side straight-flow honeycomb structure 2 and the downstream-side straight-flow honeycomb structure 5 respectively were bonded to the first green substrate. The bonded first, second and third green substrates were calcined subsequently. Thereafter, the coating layer composed of $Al_2O_3$ and $CeO_2$ was formed on the filter cellular walls 12, the upstream-side cellular walls 21, the intermediate plugs 14 and the end-surface plugs 15. Moreover, a coating layer composed of $Al_2O_3$, $TiO_2$, $ZrO_2$ and $CeO_2$, was formed on the downstream-side cellular walls 51. Then, Pt was loaded on all of the coating layers. Finally, the $NO_x$-sorbing member was loaded on the coating layers which were formed on the filter cellular walls 12 and the downstream-side cellular walls 51.

In the filter catalyst according to Example No. 7, the upstream-side straight-flow honeycomb structure 2 oxidized and purified HC, CO and SOF. Moreover, the wall-flow honeycomb structure 1 oxidized and purified PMs. In addition, the downstream-side straight-flow honeycomb structure 5 sorbed and reduced $NO_x$.

Further, not only the intermediate plugs 14 were permeable to the exhaust gases, but also they had not such a heavy thickness. Accordingly, the intermediate plugs 14 exhibited a small heat capacity. Therefore, when high-boiling point HC such as light oil was supplied as a reducing agent into the exhaust gases to purify $NO_x$, the upstream-side straight-flow honeycomb structure 2 generated reaction heat so that the temperature of the wall-flow honeycomb structure 1 was increased. Accordingly, the wall-flow honeycomb structure 1 was improved in terms of the activity when it oxidized PMs. Furthermore, in this instance, the upstream-side straight-flow honeycomb structure 2 produced highly active HC which then flowed into the downstream-side straight-flow honeycomb structure 5. Consequently, the downstream-side straight-flow honeycomb structure 5 was upgraded in terms of the activity when it reduced $NO_x$. Moreover, when the superficial area of the downstream-side straight-flow honeycomb structure 5 was enlarged by reducing the diameter of the downstream-side straight cells 50, the downstream-side straight-flow honeycomb structure 5 was enhanced in terms of the $NO_x$-purifying performance durability as well.

Having now fully described the present invention, it will be apparent to one of ordinary skill in the art that many changes and modifications can be made thereto without departing from the spirit or scope of the present invention as set forth herein including the appended claims.

What is claimed is:

1. A filter catalyst for purifying exhaust gases emitted from internal combustion engines and including particulates, the filter catalyst comprising:
   a wall-flow honeycomb structure including:
      inlet cells clogged on the downstream side of the exhaust gases;
      outlet cells neighboring the inlet cells, and clogged on the upstream side of the exhaust gases;
      filter cellular walls demarcating the inlet cells and the outlet cells, and having pores; and
      a catalytic layer formed on at least one surface selected from the group consisting of the surface of the filter cellular walls and the surface of the pores of the filter cellular walls; and
   an upstream-side straight honeycomb structure disposed on the upstream side of the exhaust gases with respect to the wall-flow honeycomb structure, provided integrally with the wall-flow honeycomb structure, and including:
      upstream-side straight cells in which the exhaust gases flow straight and which face the end surface of the filter cellular walls; and
      upstream-side cellular walls demarcating the upstream-side straight cells; and
   ramps extending from the upstream-side cellular walls in a tapered manner, connecting the upstream-side cellular walls with the filter cellular walls and leading the exhaust gases to the inlet cells.

2. The filter catalyst set forth in claim 1, wherein an oxidizing catalytic layer is formed on the surface of the upstream-side cellular walls.

3. The filter catalyst set forth in claim 1, wherein the ramp is an upstream-side end surface of the clogged outlet cells which are formed by deforming the filter cellular walls.

4. The filter catalyst set forth in claim 1 further comprising a downstream-side straight-flow honeycomb structure disposed on the downstream side of the exhaust gases with respect to the wall-flow honeycomb structure, provided integrally with the wall-flow honeycomb structure, and including: downstream-side straight cells in which the exhaust gases flow straight; and downstream-side cellular walls demarcating the downstream-side straight cells, and provided with an $NO_x$ sorbing-and-reducing catalytic layer.

5. The filter catalyst set forth in claim 1, wherein an $NO_x$ sorbing member is further loaded on the catalytic layer.

6. The filter catalyst set forth in claim 1, wherein the number of the cells in the upstream-side straight-flow honeycomb structure is more than the number of the cells in the wall-flow honeycomb structure.

7. The filter catalyst set forth in claim 4, wherein the number of the cells in the downstream-side straight-flow honeycomb structure is more than the number of the cells in the wall-flow honeycomb structure.

* * * * *